(12) United States Patent
Mason et al.

(10) Patent No.: US 11,710,935 B2
(45) Date of Patent: Jul. 25, 2023

(54) POWER CONNECTOR SYSTEM

(71) Applicant: TE Connectivity Services GmbH, Schaffhausen (CH)

(72) Inventors: Jeffery Walter Mason, North Attleboro, MA (US); William Charles McGee, III, Lincoln, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 132 days.

(21) Appl. No.: 17/345,455

(22) Filed: Jun. 11, 2021

(65) Prior Publication Data
US 2022/0399689 A1 Dec. 15, 2022

(51) Int. Cl.
*H01R 25/14* (2006.01)
*H02G 5/04* (2006.01)
*H02G 5/02* (2006.01)
*H01R 13/15* (2006.01)
*H01R 13/187* (2006.01)

(52) U.S. Cl.
CPC ............ *H01R 25/14* (2013.01); *H02G 5/025* (2013.01); *H02G 5/04* (2013.01); *H01R 13/15* (2013.01); *H01R 13/187* (2013.01)

(58) Field of Classification Search
CPC ...... H01R 25/14; H01R 13/111; H01R 13/10; H01R 31/06; H01R 13/15; H01R 25/161; H01R 25/162; H01R 13/055; H02G 5/025; H02G 5/04
See application file for complete search history.

(56) References Cited

U.S. PATENT DOCUMENTS

| | | | | |
|---|---|---|---|---|
| 5,667,413 A | * | 9/1997 | Trafton | H01R 13/187 439/271 |
| 5,886,501 A | * | 3/1999 | Marks | H01M 50/271 320/112 |
| 7,335,041 B2 | | 2/2008 | Haubach | |
| 10,892,576 B2 | * | 1/2021 | Lu | H01R 13/187 |
| 10,923,846 B1 | * | 2/2021 | Raybold | H01R 13/187 |
| 2006/0270277 A1 | * | 11/2006 | Zhao | H01R 11/28 439/627 |
| 2013/0089996 A1 | * | 4/2013 | Zhao | H01M 50/522 439/212 |
| 2020/0313355 A1 | * | 10/2020 | Bronk | H01R 13/502 |

* cited by examiner

*Primary Examiner* — Oscar C Jimenez
*Assistant Examiner* — Paul D Baillargeon

(57) ABSTRACT

A power connector system includes a busbar having a conductive plate. The conductive plate has first side and a second side. The conductive plate has a thickness profile between the first side and the second side. The conductive plate has a busbar opening therethrough between the first side and the second side. The power connector system includes a busbar connector received in the busbar opening of the conductive plate. The busbar connector includes a busbar housing and a busbar contact received in a socket of the busbar housing. The busbar housing is electrically conductive and electrically connected to the conductive plate in the busbar opening. The busbar contact is electrically conductive and electrically connected to the busbar housing in the socket. The busbar contact has a mating interface configured to mechanically and electrically connect to an electrical component plugged into the socket. The busbar housing and the busbar contact are both contained within the thickness profile of the conductive plate.

20 Claims, 8 Drawing Sheets

POWER CONNECTOR SYSTEM

BACKGROUND OF THE INVENTION

The subject matter herein relates generally to power connector systems.

Power is typically distributed to an electrical component in an electrical system using a busbar. The electrical component is electrically connected to the busbar using an electrical connector mounted to the busbar. The electrical connector extends from the busbar and increases the overall size or thickness of the system. Additionally, the housing and contacts of the electrical connector are susceptible to damage or breakage when exposed along the side of the busbar.

A need remains for a power connector system having a lower profile.

BRIEF DESCRIPTION OF THE INVENTION

In one embodiment, a power connector system is provided and includes a busbar having a conductive plate. The conductive plate has first side and a second side. The conductive plate has a thickness profile between the first side and the second side. The conductive plate has a busbar opening therethrough between the first side and the second side. The power connector system includes a busbar connector received in the busbar opening of the conductive plate. The busbar connector includes a busbar housing and a busbar contact received in a socket of the busbar housing. The busbar housing is electrically conductive and electrically connected to the conductive plate in the busbar opening. The busbar contact is electrically conductive and electrically connected to the busbar housing in the socket. The busbar contact has a mating interface configured to mechanically and electrically connect to an electrical component plugged into the socket. The busbar housing and the busbar contact are both contained within the thickness profile of the conductive plate.

In another embodiment, a power connector system is provided and includes a busbar having a conductive plate. The conductive plate has first side and a second side. The conductive plate has a thickness profile between the first side and the second side. The conductive plate has a busbar opening therethrough between the first side and the second side. The power connector system includes a busbar connector received in the busbar opening of the conductive plate. The busbar connector includes a busbar housing and a busbar contact received in a socket of the busbar housing. The busbar housing is electrically conductive and electrically connected to the conductive plate in the busbar opening. The busbar contact is electrically conductive and electrically connected to the busbar housing in the socket. The busbar contact has a mating interface. The busbar housing and the busbar contact are both contained within the thickness profile of the conductive plate. An electrical component is plugged into the socket of the busbar contact to mechanically and electrically connect with the busbar contact. The electrical component extends from the busbar connector beyond at least one of the first side and the second side.

In a further embodiment, a power connector system is provided and includes a busbar having a conductive plate. The conductive plate has first side and a second side. The conductive plate has a thickness profile between the first side and the second side. The conductive plate has a busbar opening therethrough between the first side and the second side. The power connector system includes a busbar connector received in the busbar opening of the conductive plate. The busbar connector includes a busbar housing and a busbar contact received in a socket of the busbar housing. The socket is elongated in a longitudinal direction. The socket has a first edge and a second edge on opposite sides of the socket. The first and second edges extend longitudinally. The busbar housing is electrically conductive and electrically connected to the conductive plate in the busbar opening. The busbar contact is electrically conductive and electrically connected to the busbar housing in the socket. The busbar contact has a first mating interface along the first edge and a second mating interface along the second edge. The busbar housing and the busbar contact are both contained within the thickness profile of the conductive plate. An electrical component is plugged into the socket of the busbar contact to mechanically and electrically connect with the busbar contact. The electrical component includes a circuit card has a card edge between a first surface and a second surface of the circuit card. The circuit card includes first card contacts at the first surface and second card contacts at the second surface. The circuit card is plugged into the socket of the busbar contact to interface the first card contacts with the first mating interface of the busbar contact and to interface the second card contacts with the second mating interface of the busbar contact. The circuit card extend from the busbar connector beyond at least one of the first side of the busbar and the second side of the busbar.

DETAILED DESCRIPTION OF THE INVENTION

Figure 1:
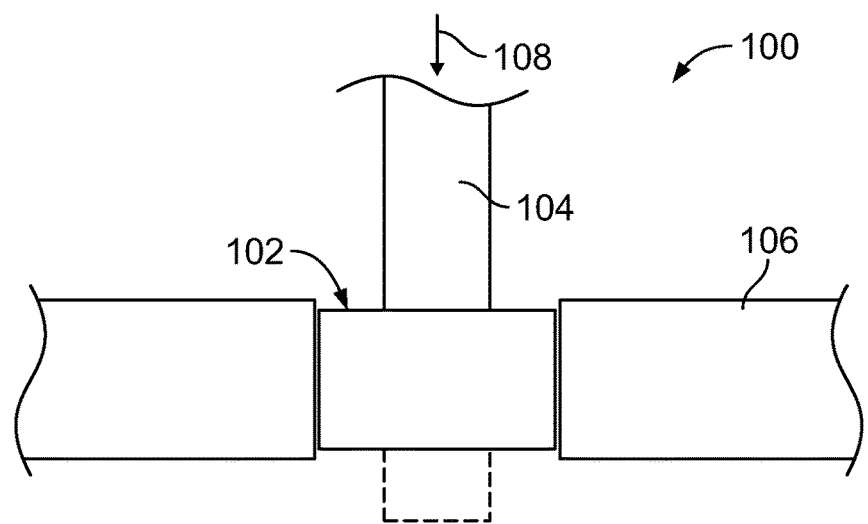
FIG. 1 is a schematic view of a power connector system in accordance with an exemplary embodiment.

FIG. 1 is a schematic view of a power connector system 100 in accordance with an exemplary embodiment. The power connector system 100 includes a busbar connector 102 used to electrically connect an electrical component 104 with a busbar 106. The busbar 106 is used to supply power to the electrical component 104. The busbar connector 102 provides a mechanical and electrical interface with the electrical component 104 and a mechanical and electrical interface with the busbar 106. In an exemplary embodiment, the busbar connector 102 has a low-profile to reduce an overall size of the power connector system 100. In an exemplary embodiment, the busbar connector 102 is recessed within the profile of the busbar 106. The busbar connector 102 does not extend beyond either side of the busbar 106, which reduces an overall size of the power connector system 100. In an exemplary embodiment, the busbar connector 102 allows the electrical component 104 to be plugged into an interior of the busbar 106, which reduces an overall size of the power connector system 100, such as compared to a system having a connector mounted to one side of the busbar 106 or the other. Optionally, a portion of the electrical component 104 may extend entirely through the busbar connector 102 and extend from the opposite side of the busbar 106 (shown in phantom in FIG. 1). Alternatively, the end of the electrical component 104 may terminate or stop inside (interior) of the busbar connector 102.

The electrical component 104 may be various types of electrical components in various embodiments. The electrical component 104 may be a pin or terminal configured to be plugged into the busbar connector 102. For example, the terminal may be cylindrical or rectangular and configured to be plugged into the busbar connector 102 to electrically connect to the busbar connector 102. The terminal may be electrically connected to another component, such as a circuit board, a cable, or another component. In other various embodiments, the electrical component 104 may be directly plugged into the busbar connector 102 without the use of a separate terminal. For example, the electrical component 104 may be a circuit card configured to be plugged into the busbar connector 102. For example, a card edge of the circuit card may be plugged directly into the busbar connector 102. In other various embodiments, the electrical component 104 may be another busbar configured to be plugged into the busbar connector 102.

The electrical component 104 is mated with the busbar connector 102 in a mating direction 108. In the illustrated embodiment, the mating direction 108 is generally perpendicular to the busbar 106. Optionally, the mating direction 108 may be oriented generally vertically while the busbar 106 is oriented generally horizontally. In alternative embodiments, the mating direction 108 may be oriented generally horizontally while the busbar 106 may be oriented generally vertically. Other orientations are possible in alternative embodiments. In an exemplary embodiment, the electrical component 104 is mated with the busbar connector 102 at a separable mating interface allowing the electrical component 104 to be removed or unplugged from the busbar connector 102.

Figure 2:
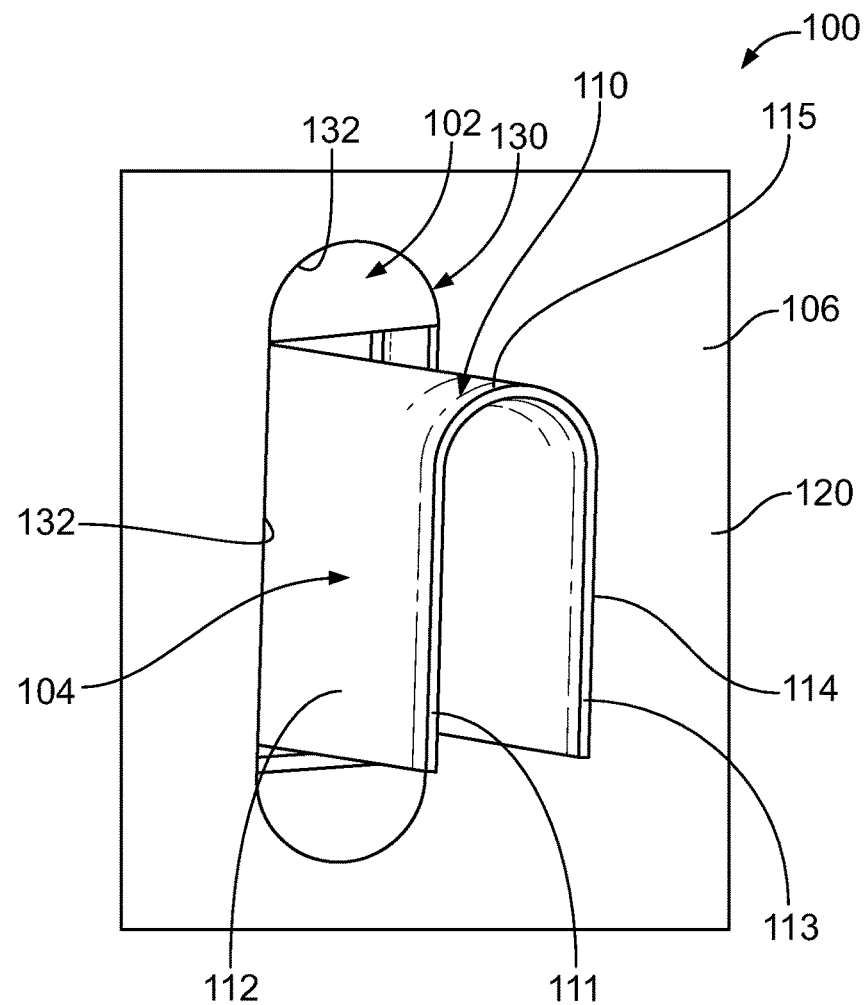
FIG. 2 is a perspective view of the power connector system in accordance with an exemplary embodiment.
Figure 3:
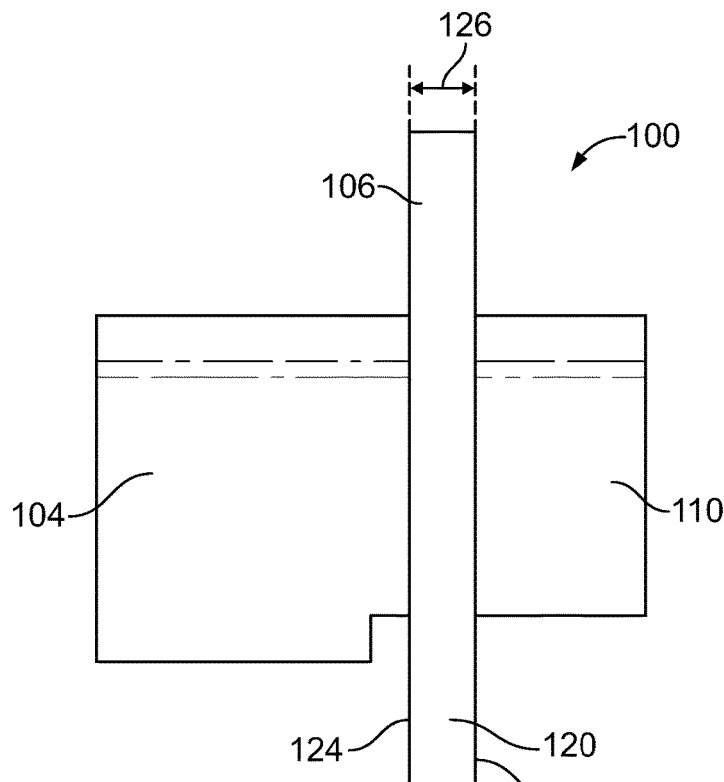
FIG. 3 is a side view of the power connector system in accordance with an exemplary embodiment.

FIG. 2 is a perspective view of the power connector system 100 in accordance with an exemplary embodiment. FIG. 3 is a side view of the power connector system 100 in accordance with an exemplary embodiment. FIGS. 2 and 3 illustrates the busbar connector 102 coupled to the busbar 106. FIGS. 2 and 3 illustrates the electrical component 104 plugged into the busbar connector 102.

In the illustrated embodiment, the electrical component 104 includes a box terminal 110 plugged into the busbar connector 102. The box terminal 110 includes a first wall 111 defining a first mating surface 112 and a second wall 113 defining a second mating surface 114. In an exemplary embodiment, the first and second mating surfaces 112, 114 are planar and generally parallel to each other. The mating surfaces 112, 114 are provided at exterior surfaces of the first and second walls 111, 113. The mating surfaces 112, 114 face outward to interface with the busbar connector 102. The first and second mating surfaces 112, 114 provide a large amount of surface area for interfacing with the busbar connector 102 to allow high power transfer between the electrical component 104 and the busbar connector 102. The heights of the walls 111, 113 and the busbar connector 102 may be controlled (for example, increased or decreased) to control power transfer between the electrical component 104 and the busbar connector 102. The box terminal 110 may be stamped and formed or machined, which are less expensive manufacturing processes than screw machining cylindrical terminals. A connecting wall 115 extends between the first and second walls 111, 113. In the illustrated embodiment, the connecting wall 115 is a curved wall such that the box terminal 110 is generally U-shaped. However, the connecting wall 115 may be perpendicular to the first and second walls 111, 113 in alternative embodiments. The connecting wall 115 may be flexible to allow the first and second walls 111, 113 to move relative to each other, such as during mating with the busbar connector 102. Optionally, a second connecting wall (not shown) may extend between the first and second walls 111, 113 opposite the connecting wall 115. For example, the box terminal 110 may be rectangular having walls on all four sides. Other shapes are possible in alternative embodiments.

The busbar 106 includes a conductive plate 120. For example, the conductive plate 120 may be a copper plate or an aluminum plate. The conductive plate 120 includes a first side 122 and a second side 124. The conductive plate 120 may be oriented vertically such that the first side 122 defines a front and the second side 124 defines a rear. The conductive plate 120 may be oriented horizontally such that the first side 122 defines a top and the second side 124 defines a bottom. Other orientations are possible in alternative embodiments. The conductive plate 120 has a thickness profile 126 defined between the first and second sides 122, 124. The thickness profile 126 is defined by the outer most portion of the first side 122 and the outer most portion of the second side 124. In the illustrated embodiment, the first and second sides 122, 124 are planar and parallel to each other such that the first and second sides 122, 124 define the thickness profile 126.

The busbar 106 includes a busbar opening 130 passing through the busbar 106. In the illustrated embodiment, the busbar opening 130 is open at the first side 122 and open at the second side 124. However, the busbar opening 130 may be closed at the first side 122 or the second side 124 in alternative embodiments. The busbar opening 130 is defined by edges 132 of the conductive plate 120. In the illustrated embodiment, the edges 132 completely surround the busbar opening 130 to enclose the busbar opening 130 within the conductive plate 120. However, in alternative embodiments, the busbar opening 130 may be provided at an exterior edge of the conductive plate 120 as opposed to being located interior of the conductive plate 120. In the illustrated embodiment, the edges 132 form an oval-shaped busbar opening 130. For example, the busbar opening 130 is obround or stadium shaped having two parallel sides and two curved sides (for example, a two-dimensional geometric shape constructed of a rectangle with semicircles at the opposite sides). However, the busbar opening 130 may have other shapes in alternative embodiments, such as being circular, rectangular, or having other regular or irregular shapes.

The busbar connector 102 is received in the busbar opening 130. The busbar connector 102 is contained within the thickness profile 126 of the conductive plate 120. For example, no portion of the busbar connector 102 extends beyond the first side 122 of the conductive plate 120 and no portion of the busbar connector 102 extends beyond the second side 124 of the conductive plate 120. The busbar connector 102 has a thickness less than or equal to the thickness profile 126 of the conductive plate 120. As such, the busbar connector 102 does not increase the overall size of the busbar 106. The busbar connector 102 does not increase the thickness of the busbar 106. The busbar connector 102 is able to receive the electrical component 104 to allow the electrical component 104 to pass at least partially into the busbar 106. In the illustrated embodiment, the electrical component 104 passes through the busbar 106 such that the electrical component 104 is located on both sides of the busbar 106, which reduces the overall size of the power connector system 100. In an exemplary embodiment, allowing the electrical component 104 to pass entirely through the busbar 106 may greatly reduce the amount of extension of the electrical component 104 beyond one side of the busbar 106 (for example, the first side 122) by allowing at least a portion of the electrical component 104 to extend from the opposite side (for example, the second side 124). For example, the electrical component 104 may be moved closer to the busbar 106. The electrical component 104 may be slid deeper into the cabinet holding the busbar 106.

Figure 4:
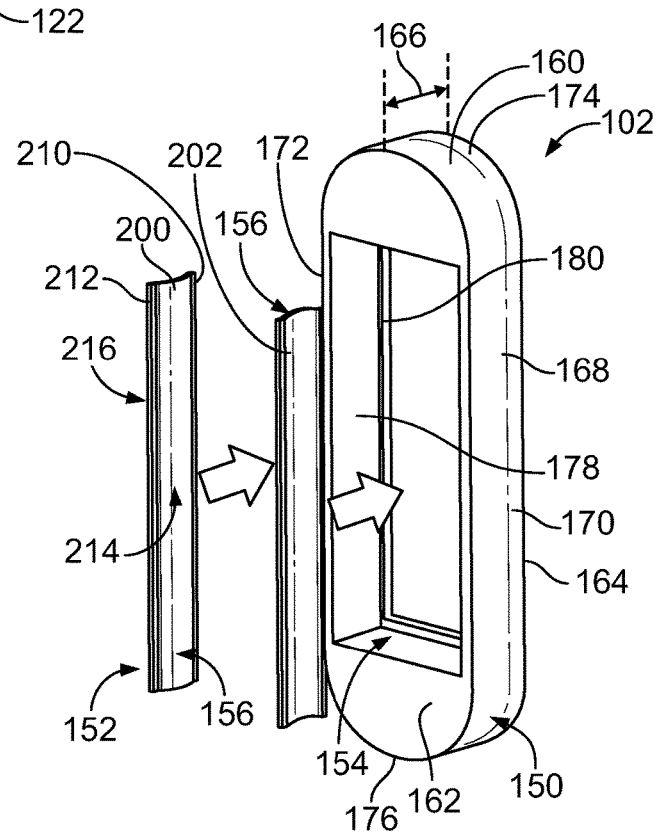
FIG. 4 is an exploded view of the busbar connector in accordance with an exemplary embodiment.
Figure 5:
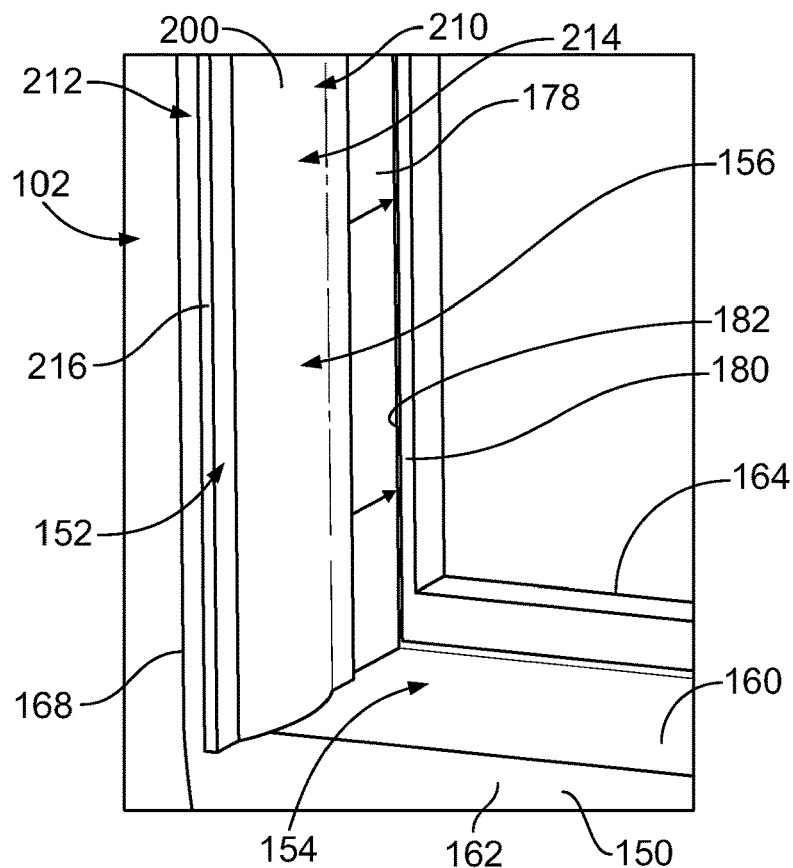
FIG. 5 is a partially assembled view of a portion of the busbar connector in accordance with an exemplary embodiment.
Figure 6:
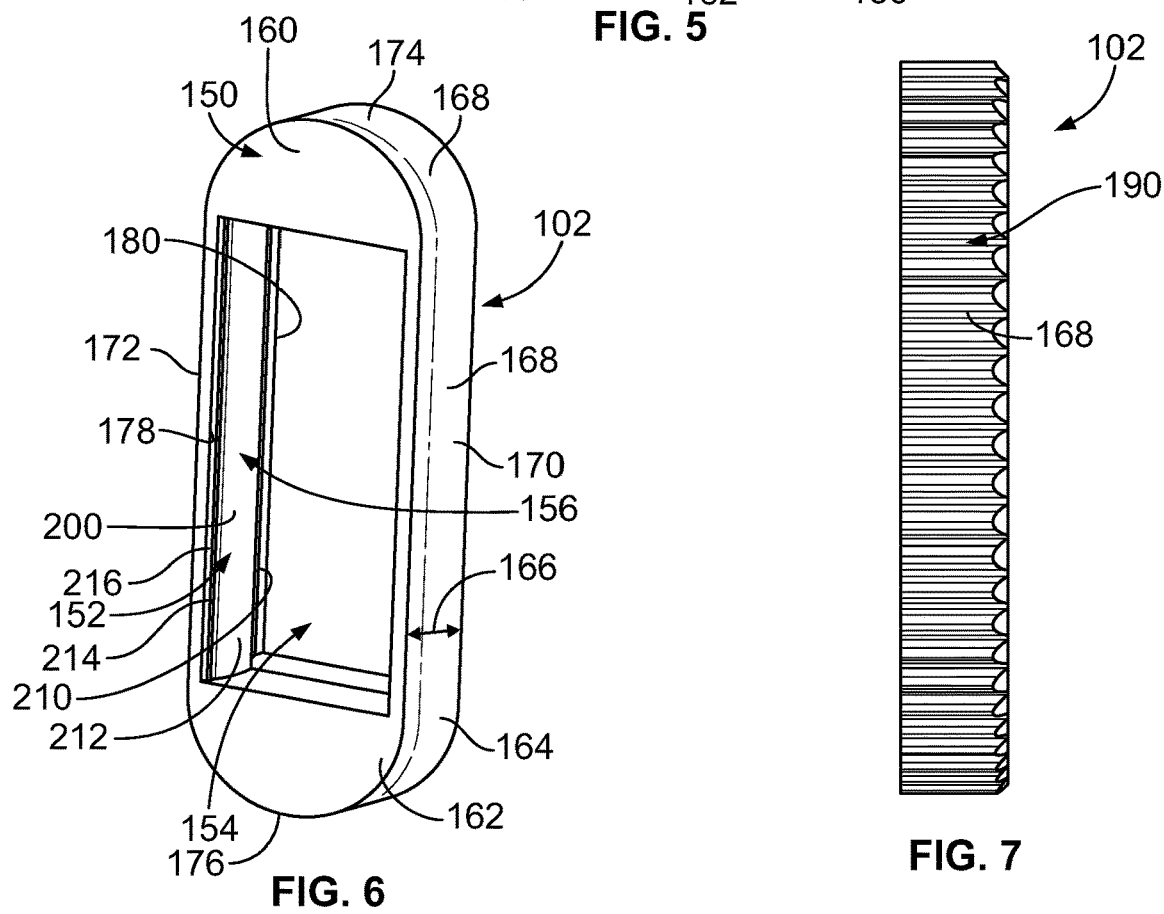
FIG. 6 is an assembled view of the busbar connector in accordance with an exemplary embodiment.

FIG. 4 is an exploded view of the busbar connector 102 in accordance with an exemplary embodiment. FIG. 5 is a partially assembled view of a portion of the busbar connector 102 in accordance with an exemplary embodiment. FIG. 6 is an assembled view of the busbar connector 102 in accordance with an exemplary embodiment.

The busbar connector 102 includes a busbar housing 150 and a busbar contact 152 received in the busbar housing 150. In an exemplary embodiment, the busbar housing 150 includes a socket 154 that receives the busbar contact 152. The busbar housing 150 is electrically conductive and configured be mechanically and electrically connected to the busbar 106 (shown in FIG. 2). The busbar contact 152 is electrically conductive and configured to be mechanically and electrically connected to the busbar housing 150. The busbar contact 152 includes a mating interface 156 configured to be mechanically and electrically connected to the electrical component 104. For example, the electrical component 104 is configured to be plugged into the socket 154 to mate with the busbar contact 152 at the mating interface 156. The busbar housing 150 may have guide or lead-in surfaces to guide the electrical component 104 into the socket 154 for alignment. An electrical path is created between the busbar 106 and the electrical component 104 through the busbar housing 150 and through the busbar contact 152. In an exemplary embodiment, the busbar contact 152 is a separate and discrete component from the busbar housing 150. However, in alternative embodiments, the busbar contact 152 may be integral with the busbar housing 150 is a unitary, monolithic structure.

The busbar housing 150 includes a housing block 160. The housing block 160 is manufactured from a conductive material. For example, the housing block 160 may be manufactured from a copper or aluminum material. Optionally, the housing block 160 may be a stamped housing block. Alternatively, the housing block 160 may be created (e.g., mailed) from a metal block of material. In other alternative embodiments, the housing block 160 may be a diecast structure. The socket 154 is defined by an opening in the housing block 160.

The busbar housing 150 extends between a front side or front face 162 and a rear side or rear face 164. In various embodiments, the front face 162 is parallel to the rear face 164. Optionally, the front face 162 may be generally planar and/or the rear face 164 may be generally planar. However, the front face 162 and/or the rear face 164 may include recesses, pockets, steps, extensions, ribs, flanges, or other features that define nonplanar surfaces. In an exemplary embodiment, the socket 154 is open at the front face 162 and open at the rear face 164 to allow the electrical component 104 to pass through the busbar housing 150. In alternative embodiments, the busbar housing 150 may be closed at the rear face 164 or the front face 162. The busbar housing 150 has a thickness 166 between the front face 162 and the rear face 164. In an exemplary embodiment, the thickness 166 is less than a thickness profile 126 of the busbar 106. In an another exemplary embodiment, the thickness 166 is equal to the thickness profile 126 of the busbar 106.

The busbar housing 150 includes an exterior surface 168 around the exterior of the busbar housing 150. In an exemplary embodiment, the busbar housing 150 has a complementary shape as the busbar opening 130 in the busbar 106 to fit the busbar housing 150 in the busbar opening 130. In the illustrated embodiment, the exterior surface 168 is oval-shaped, such as being obround or stadium shaped. The busbar housing 150 includes a first side 170, a second side 172, a first end 174, and a second end 176. In the illustrated embodiment, the first and second sides 170, 172 are planar and parallel to each other. The first and second ends 174, 176 are curved, such as being semicircular. The first and second ends 174, 176 may be planar and perpendicular to the first and second sides 170, 172 in alternative embodiments. In other alternative embodiments, the first and second sides 170, 172 may be nonplanar, such as being curved or convex shaped. The exterior surface 168 may have other shapes in alternative embodiments, such as being circular, rectangular, or other regular or irregular shapes.

In an exemplary embodiment, the busbar housing 150 includes interior surfaces 178 defining the socket 154. The interior surfaces 178 surround the socket 154. In the illustrated embodiment, the socket 154 is rectangular shaped defined by first and second side surfaces and first and second end surfaces. The socket 154 may have other shapes in alternative embodiments, such as a circular shape, an oval-shaped, or another regular or irregular shape.

In an exemplary embodiment, the busbar housing 150 includes a flange 180 extending from the interior surface 178 into the socket 154. The flange 180 is used to locate the busbar contact 152 in the socket 154. In the illustrated embodiment, the flange 180 extends from the side surfaces and the end surfaces defining the socket 154. In an exemplary embodiment, the busbar housing 150 includes retention features 182 used to hold the busbar contact 152 in the busbar housing 150. For example, the retention features 182 (FIG. 5) may be tabs extending from the flange 180 to interface with and hold the busbar contact 152 in the busbar housing 150. In other various embodiments, the retention features 182 may be slots or grooves that receive the busbar contact 152. Other types of retention features may be used in alternative embodiments.

The busbar contact 152 is received in the socket 154 and coupled to the busbar housing 150. In the illustrated embodiment, the busbar contact 152 includes a plurality of discrete contact members received in the socket 154. For example, the busbar contact 152 includes a first contact member 200 and a second contact member 202. The first contact member 200 is received in the socket 154 along the first side of the socket 154 while the second contact member 202 is received in the socket 154 along the second side of the socket 154. For example, the contact members 200, 202 extend along the interior surfaces 178 generally at the first and second sides 170, 172 of the busbar housing 150. The busbar contact 152 may include additional contact members, such as contact members extending between the first and second contact members 200, 202, which may extend along the first and second ends of the socket 154. For example, the busbar contact 152 may be generally rectangular in shape. In other alternative embodiments, the busbar contact 152 may be generally U-shaped to extend along the opposite first and second sides as well as one of the ends of the socket 154.

The busbar contact 152 is manufactured from a metal material, such as a copper material. In various embodiments, the busbar contact 152 may be a stamped and formed contact. The busbar contact 152 may be manufactured from a different material and/or manufactured using a different manufacturing process than the busbar housing 150. The busbar contact 152 includes a base 210 and one or more contact fingers 212 extending from the base 210. In an exemplary embodiment, the first and second contact members 200, 202 may be similar or identical, each including the corresponding base 210 and the corresponding contact fingers 212.

The base 210 is configured to be mounted to the busbar housing 150. The contact finger 212 defines a mating interface 214 for the busbar contact 152 configured to interface with the electrical component 104. In an exemplary embodiment, the busbar contact 152 includes a plurality of the contact fingers 212 extending from the base 210. The base 210 is used to interconnect the contact fingers 212. The contact fingers 212 may be separated by gaps, which may be formed during a stamping process. The contact fingers are independently movable relative to each other. Each contact finger 212 defines a point of contact to define the mating interface 214 with the electrical component 104. As such, the busbar contact 152 includes a plurality of points of contact with the electrical component 104 to transfer power across the mating interface 214. The contact finger 212 extends to a distal end 216. Optionally, the distal end 216 may abut against the interior surface 178 of the busbar housing 150 to support the contact finger 212. In an exemplary embodiment, the contact finger 212 is bulged or curved inward between the base 210 and the distal end 216. The curved portion of the contact finger 212 extends into the socket 154 to interface with the electrical component 104 when the electrical component 104 is plugged into the socket 154. The contact finger 212 is deflectable to accommodate misalignment of the electrical component 104 with the busbar connector 102. In an exemplary embodiment, the base 210 may be planar and the distal end 216 may be planar with the contact finger 212 therebetween be nonplanar. The base 210 may be co-planer with the distal end 216 such that both the base 210 and the distal end 216 rest against the interior surface 178 of the busbar housing 150. The busbar contact 152 may have other shapes in alternative embodiments.

During assembly, the busbar contact 152 is loaded into the socket 154, such as through the front face 162. The busbar contact 152 is coupled to the interior surface 178. The busbar contact 152 may be loaded against the flange 180. For example, the base 210 may abut against the flange 180. The flange 180 may function as a stop for locating the busbar contact 152 in the socket 154. When loaded, the busbar contact 152 engages the retention features 182. The retention features 182 retain the busbar contact 152 in the socket 154. For example, the retention features 182 may engage the base 210. The contact fingers 212 are positioned in the socket 154 to interface with the electrical component 104 when the electrical component 104 is plugged into the socket 154.

Figure 7:
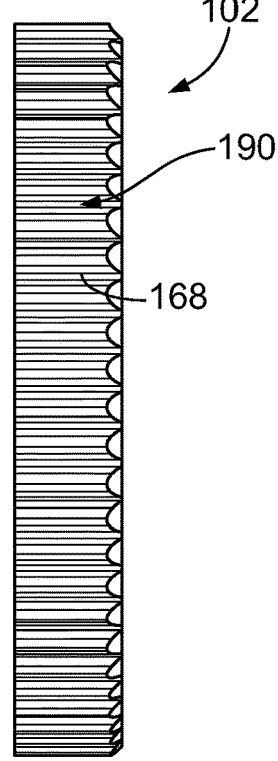
FIG. 7 is a side view of the busbar connector in accordance with an exemplary embodiment.

FIG. 7 is a side view of the busbar connector 102 in accordance with an exemplary embodiment. In the illustrated embodiment, the busbar housing 150 includes a plurality of knurled features along the exterior surface 168. The knurled features 190 are configured to be press-fit into the busbar 106 to mechanically and electrically connect the busbar connector 102 to the busbar 106.

Figure 8:
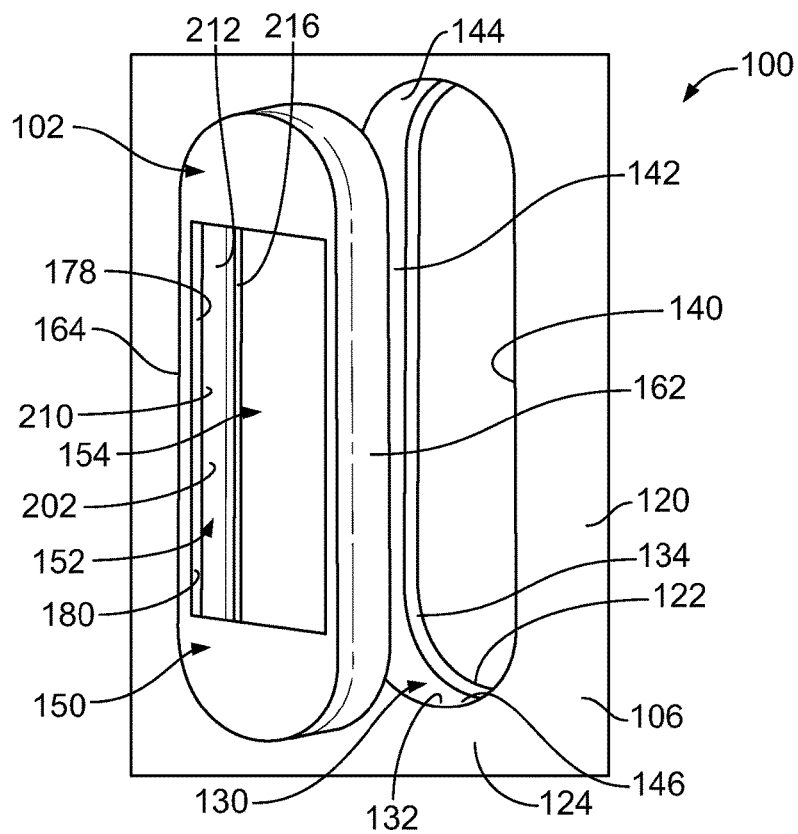
FIG. 8 is a front perspective view of the power connector system in accordance with an exemplary embodiment.
Figure 9:
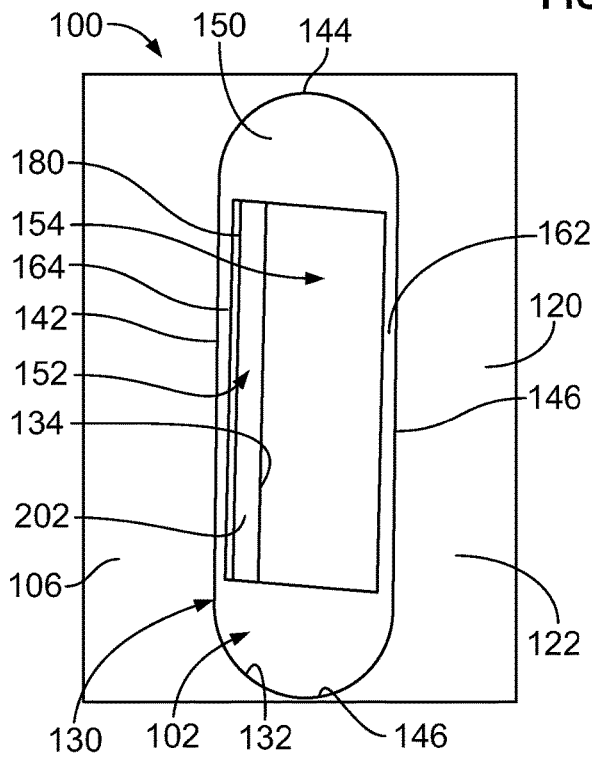
FIG. 9 is a front perspective view of the power connector system in accordance with an exemplary embodiment.
Figure 10:
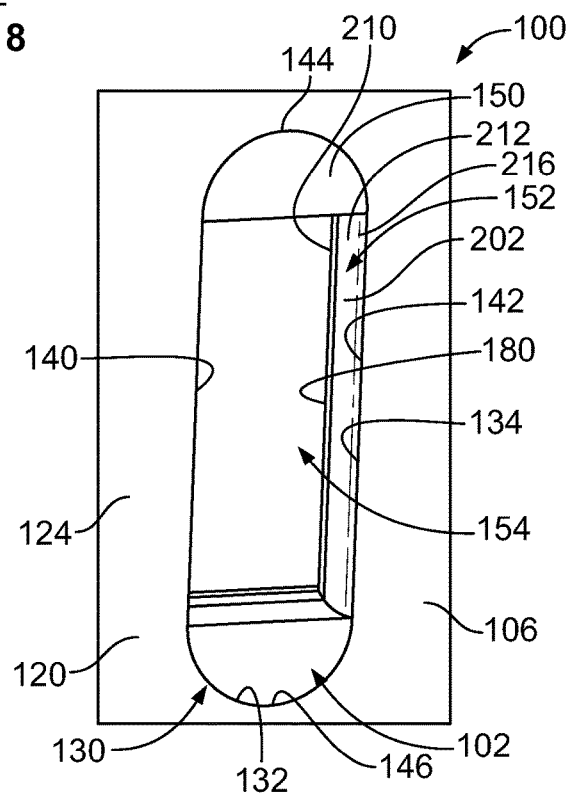
FIG. 10 is a rear perspective view of the power connector system in accordance with an exemplary embodiment.

FIG. 8 is a front perspective view of the power connector system 100 in accordance with an exemplary embodiment showing the busbar connector 102 poised for loading into the busbar 106. FIG. 9 is a front perspective view of the power connector system 100 in accordance with an exemplary embodiment showing busbar connector 102 assembled with the busbar 106. FIG. 10 is a rear perspective view of the power connector system 100 in accordance with an exemplary embodiment showing the busbar connector 102 assembled with the busbar 106.

During assembly, the busbar connector 102 is loaded into the busbar opening 130 through either the first side 122 or the second side 124. In the illustrated embodiment, the first side 122 defines a front side of the busbar 106 and the second side 124 defines a rear side of the busbar 106. Other orientations are possible in alternative embodiments. In an exemplary embodiment, the conductive plate 120 includes a flange 134 extending from the edge 132 into the busbar opening 130. In the illustrated embodiment, the flange 134 is provided at the second side 124 of the busbar 106. Other locations are possible in alternative embodiments. The flange 134 is used to locate the busbar connector 102 in the busbar opening 130. For example, the busbar connector 102 is loaded into the busbar opening 130 until the busbar connector 102 engages the flange 134. The flange 134 operates as a stop to locate the busbar connector 102 in the busbar opening 130. In the illustrated embodiment, the flange 134 entirely surrounds the busbar opening 130. For example, the flange 134 is located along a first side 140, a second side 142, a first and 144, and a second end 146 of the busbar opening 130. In the illustrated embodiment, the first and second sides 140, 142 are planar and parallel to each other and the first and second ends 144, 146 are curved between the first and second sides 140, 142. In alternative embodiments, the first and second ends 144, 146 may be planar and perpendicular to the first and second sides 140, 142 to form a rectangular busbar opening 130. Other walls may be provided in alternative embodiments to change the shape of the busbar opening 130.

When assembled, the busbar connector 102 is received in the busbar opening 130. The busbar connector 102 is mechanically and electrically coupled to the busbar 106. The busbar housing 150 may be press-fit into the busbar opening 130, such as using the knurled features 190 (shown in FIG.

6). The busbar housing 150 may be welded or soldered to the conductive plate 120. In an exemplary embodiment, the busbar connector 102 has a low-profile to reduce an overall size of the power connector system 100. For example, the busbar connector 102 is recessed within the thickness profile 126 of the busbar 106. The busbar connector 102 does not extend beyond either side of the busbar 106. The front face 162 of the busbar housing 150 is flush with or recessed from the first side 122 of the conductive plate 120. The rear face 164 of the busbar housing 150 is flush with or recessed from the second side 124 of the conductive plate 120. No portion of the busbar connector 102 extends beyond the first side 122 of the conductive plate 120 and no portion of the busbar connector 102 extends beyond the second side 124 of the conductive plate 120. As such, the busbar connector 102 does not increase the overall size of the busbar 106. The busbar connector 102 does not increase the thickness of the busbar 106.

In an exemplary embodiment, the busbar connector 102 is thermally coupled to the busbar 106. For example, the busbar housing 150 is thermally coupled directly to the conductive plate 120. The busbar contact 152 is thermally coupled to the busbar housing 150. For example, the base 210 and the distal end 216 directly engage the interior surface 178 to provide efficient heat transfer between the busbar contact 152 and the busbar housing 150. Heat may be efficiently transferred from the electrical component 104 to the busbar 106 through the busbar contact 152 and the busbar housing 150. The busbar 106 may be used as a heat sink to dissipate heat from the electrical component 104.

The busbar connector 102 includes the socket 154, which is configured to receive the electrical component 104 to allow the electrical component 104 to pass at least partially into the busbar 106. The busbar housing 150 is contained within the thickness profile 126 of the busbar 106. The busbar contact 152 is received in the socket 154 and contained within the thickness profile 126 of the busbar 106. The busbar contact 152 extends into the socket 154 to interface with the electrical component 104. In the illustrated embodiment, the contact fingers 212 extend along the opposite sides of the socket 154 to interface with opposite sides of the electrical component 104. Other arrangements are possible in alternative embodiments. In an exemplary embodiment, the busbar contact 152 (for example, the first and second contact members 200, 202) are captured in the socket 154. For example, the busbar contact 152 is captured between the flange 180 of the busbar housing 150 and the flange 134 of the conductive plate 120.

Figure 11:
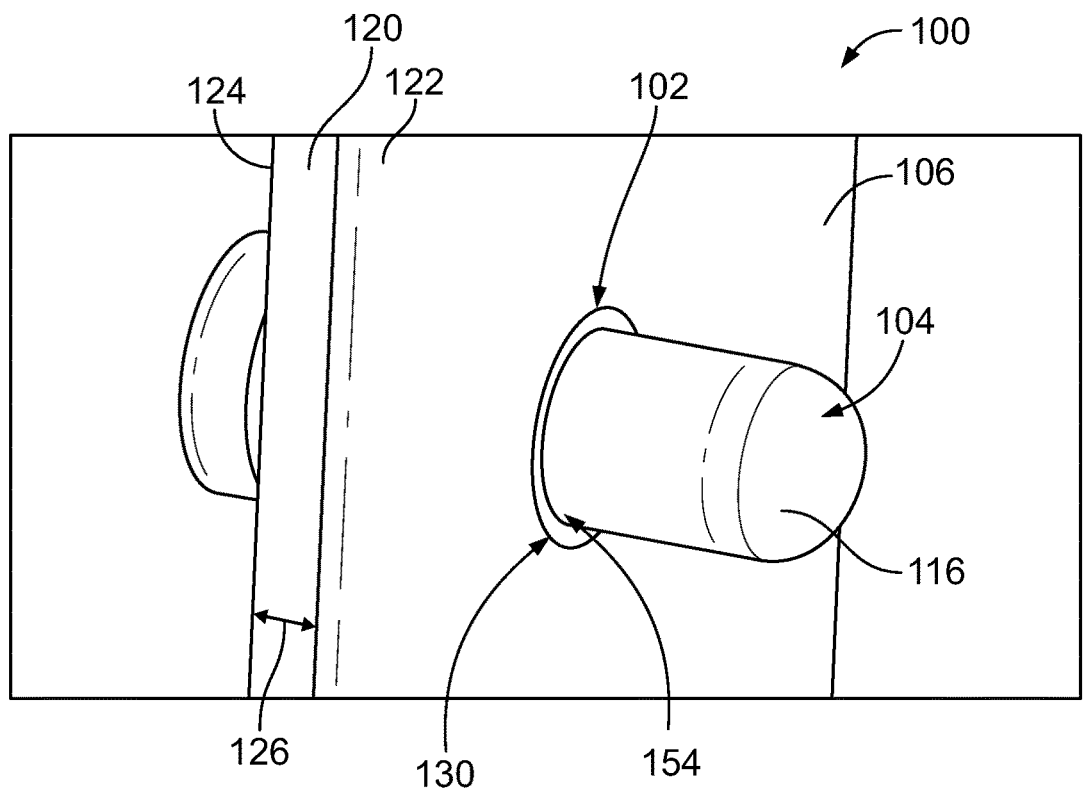
FIG. 11 is a perspective view of the power connector system in accordance with an exemplary embodiment.
Figure 12:
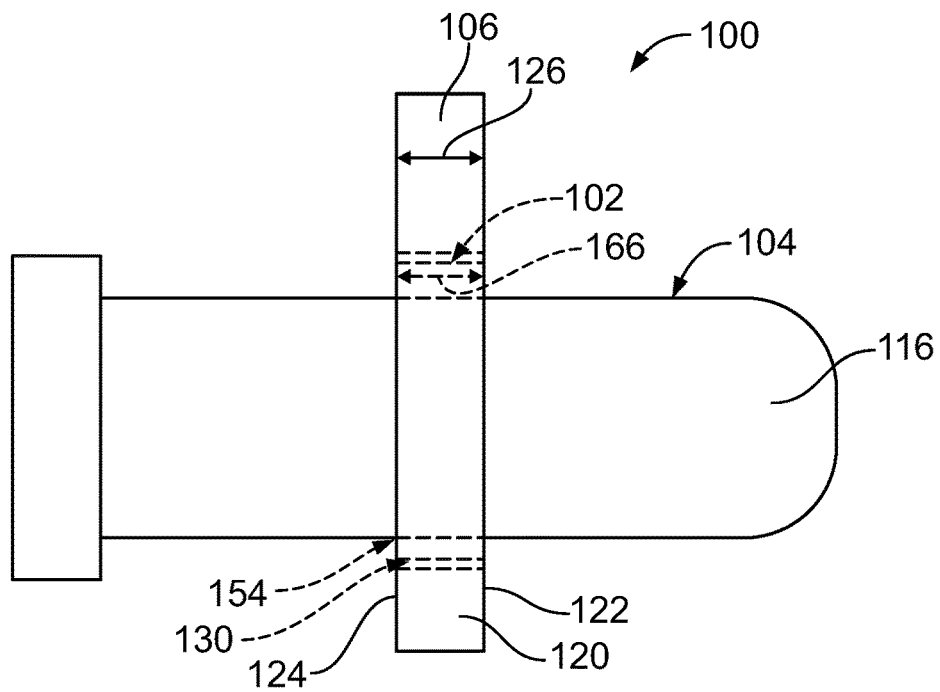
FIG. 12 is a side view of the power connector system in accordance with an exemplary embodiment.

FIG. 11 is a perspective view of the power connector system 100 in accordance with an exemplary embodiment. FIG. 12 is a side view of the power connector system 100 in accordance with an exemplary embodiment. FIGS. 11 and 12 illustrate the busbar connector 102 coupled to the busbar 106 and the electrical component 104 plugged into the busbar connector 102. FIGS. 11 and 12 illustrate the electrical component 104 including a pin terminal 116 (as opposed to the box terminal 110 shown in FIGS. 2 and 3). The pin terminal 116 is cylindrical and extends to a mating end. An opposite end of the pin terminal 116 may be coupled to a cable, a circuit board, or another device of the electrical component 104.

The busbar 106 includes the busbar opening 130 passing through the conductive plate 120 of the busbar 106. The busbar opening 130 is round. In the illustrated embodiment, the busbar opening 130 is open at the first side 122 and open at the second side 124. The busbar connector 102 is received in the busbar opening 130. The busbar connector 102 is round. The busbar connector 102 is contained within the thickness profile 126 of the conductive plate 120. In the illustrated embodiment, no portion of the busbar connector 102 extends beyond the first side 122 of the conductive plate 120 and no portion of the busbar connector 102 extends beyond the second side 124 of the conductive plate 120. The thickness 166 of the busbar connector 102 is less than or equal to the thickness profile 126 of the conductive plate 120. As such, the busbar connector 102 does not increase the overall size of the busbar 106.

The busbar connector 102 includes the socket 154 that receives the electrical component 104. In an exemplary embodiment, the socket 154 is open through the busbar connector 102 to allow the pin terminal 116 to pass through the busbar 106 such that the pin terminal 116 is located on both sides of the busbar 106, which reduces the overall size of the power connector system 100.

Figure 13:
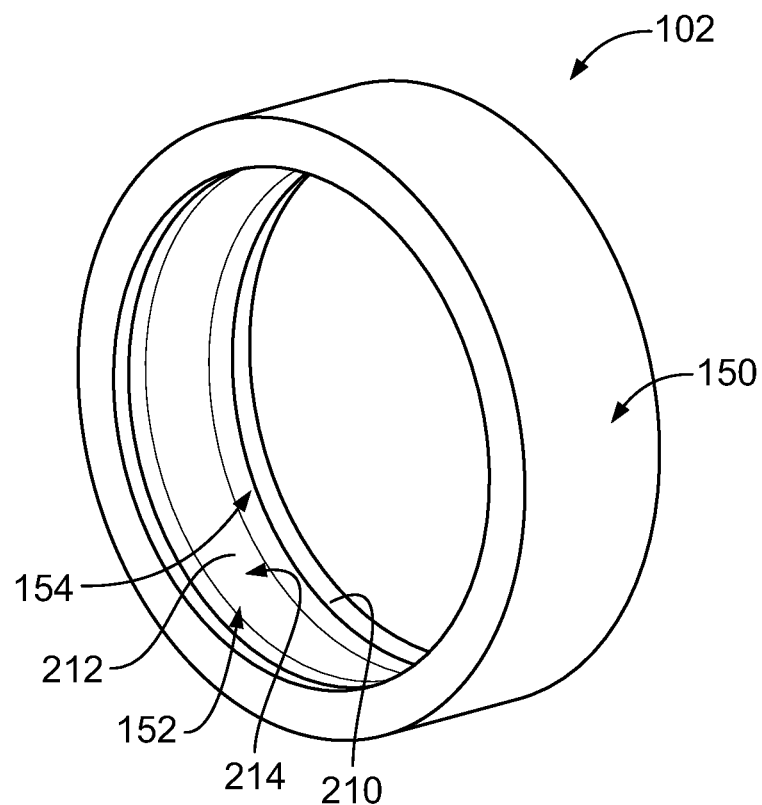
FIG. 13 is an assembled view of the busbar connector in accordance with an exemplary embodiment.
Figure 14:
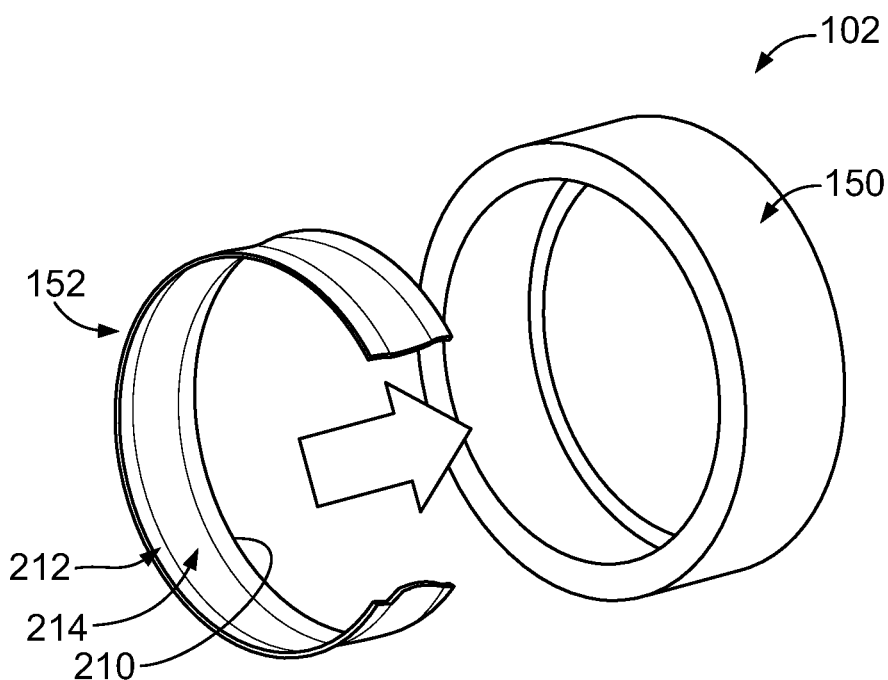
FIG. 14 is an exploded view of the busbar connector in accordance with an exemplary embodiment.

FIG. 13 is an assembled view of the busbar connector 102 in accordance with an exemplary embodiment. FIG. 14 is an exploded view of the busbar connector 102 in accordance with an exemplary embodiment. The busbar connector 102 includes the busbar housing 150 and the busbar contact 152 received in the socket 154 of the busbar housing 150. In an exemplary embodiment, the busbar housing 150 is ring-shaped having a circular profile. The socket 154 is circular to receive the cylindrical pin terminal 116 (shown in FIGS. 11 and 12). The busbar contact 152 is ring-shaped, such as being a split-ring or C-clip configured to be loaded into the socket 154. The base 210 is ring-shaped and the contact finger 212 is ring-shaped. The contact finger 212 is bulged radially inward to position the mating interface 214 in the interior of the socket 154 for interfacing with the pin terminal 116.

Figure 15:
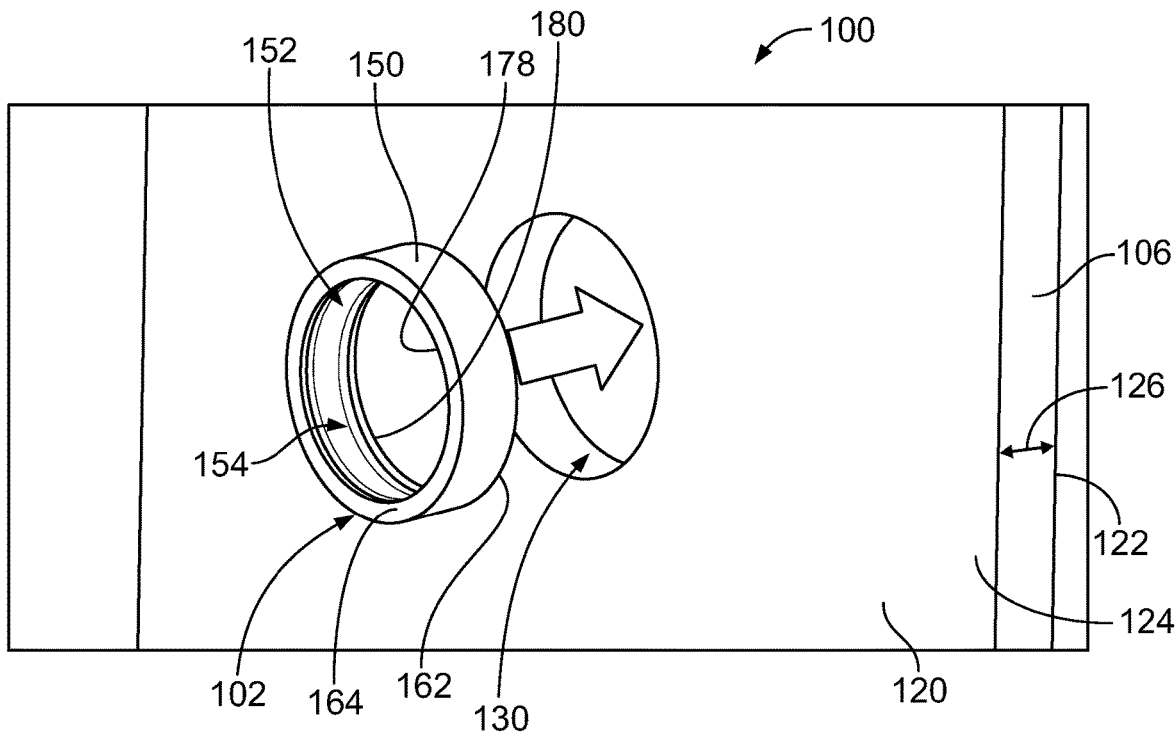
FIG. 15 is a front perspective view of the power connector system in accordance with an exemplary embodiment.
Figure 16:
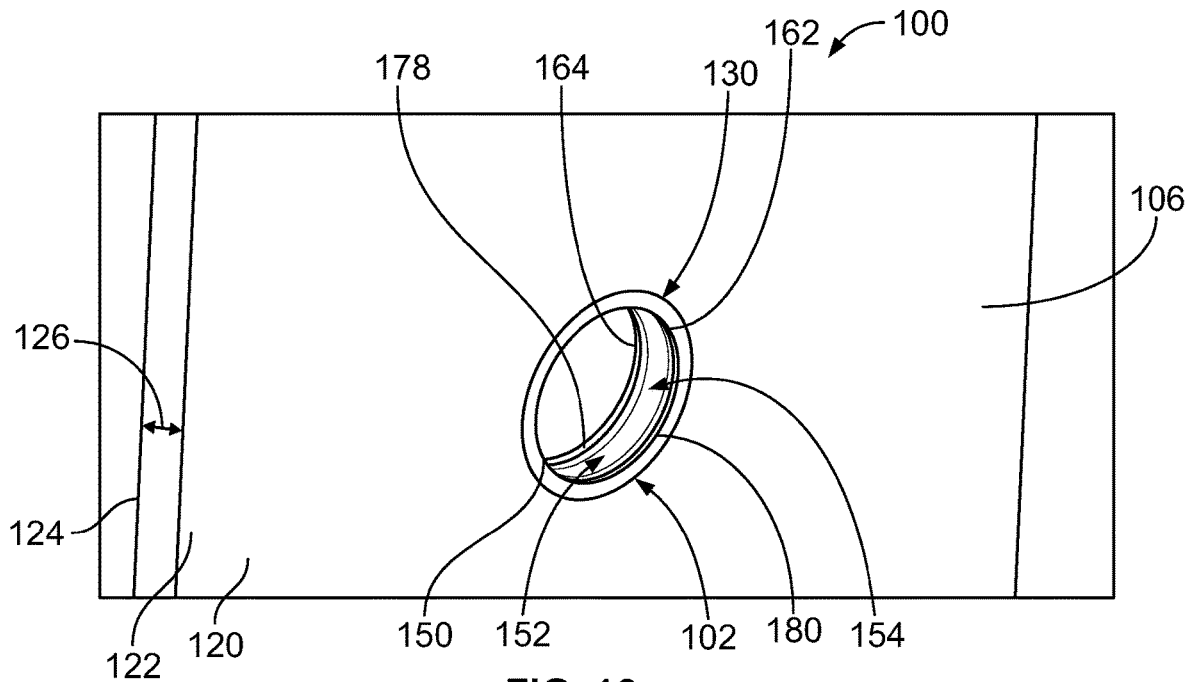
FIG. 16 is a rear perspective view of the power connector system in accordance with an exemplary embodiment.

FIG. 15 is a front perspective view of the power connector system 100 in accordance with an exemplary embodiment showing the busbar connector 102 poised for loading into the busbar 106. FIG. 16 is a rear perspective view of the power connector system 100 in accordance with an exemplary embodiment showing the busbar connector 102 assembled with the busbar 106.

During assembly, the busbar contact 152 is loaded into the socket 154 of the busbar housing 150, such as through the front face 162. The busbar contact 152 is coupled to the interior surface 178. The busbar contact 152 may be loaded against the flange 180 at the rear face 164 to function as a stop for locating the busbar contact 152 in the socket 154. The busbar connector 102 is loaded into the busbar opening 130, such as through the first side 122 of the busbar 106. The conductive plate 120 may include a flange (not shown) to locate the busbar connector 102 in the busbar opening 130. The busbar housing 150 may be press-fit into the busbar opening 130, such as using knurled features.

In an exemplary embodiment, the busbar connector 102 has a low-profile to reduce an overall size of the power connector system 100. For example, the busbar connector 102 is recessed within the thickness profile 126 of the busbar 106. The busbar connector 102 does not extend beyond either side of the busbar 106. The front face 162 of the busbar housing 150 is flush with or recessed from the first side 122 of the conductive plate 120. The rear face 164 of the busbar housing 150 is flush with or recessed from the second side 124 of the conductive plate 120. No portion of the busbar connector 102 extends beyond the first side 122 of the conductive plate 120 and no portion of the busbar connector 102 extends beyond the second side 124 of the conductive plate 120. As such, the busbar connector 102 does not increase the overall size of the busbar 106. The busbar connector 102 does not increase the thickness of the busbar 106.

Figure 17:
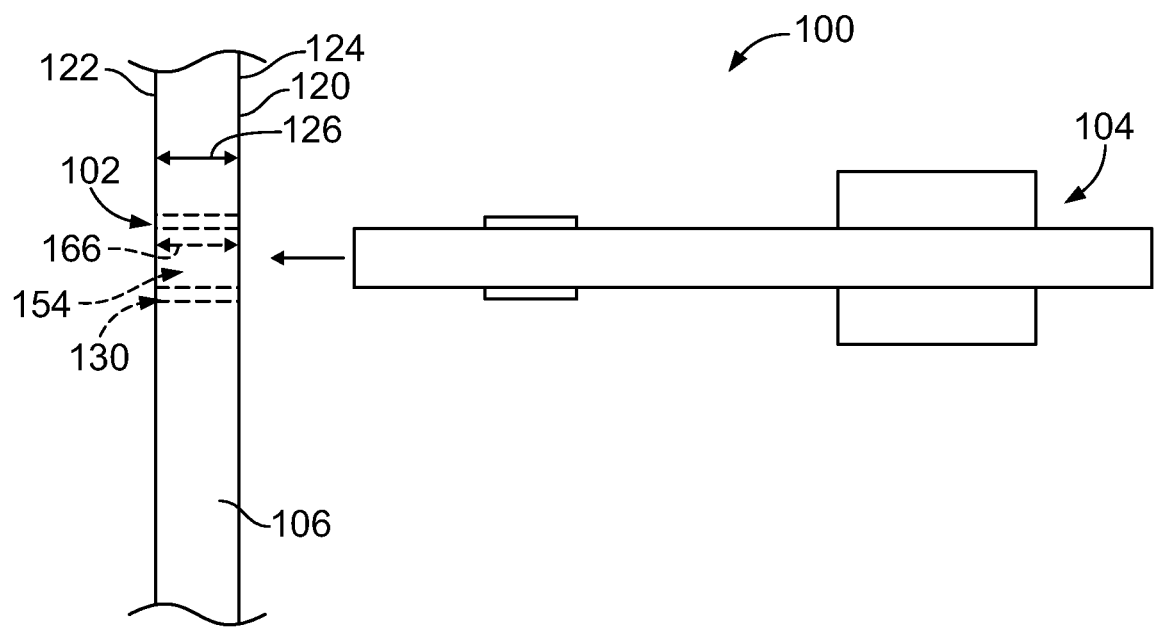
FIG. 17 is a side view of the power connector system in accordance with an exemplary embodiment.
Figure 18:
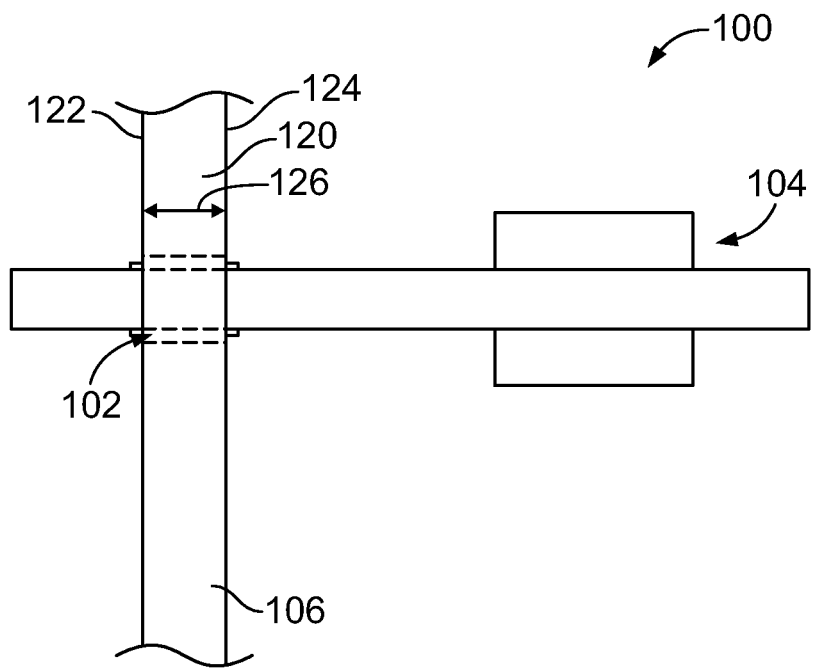
FIG. 18 is a side view of the power connector system in accordance with an exemplary embodiment.

FIG. 17 is a side view of the power connector system 100 in accordance with an exemplary embodiment showing the electrical component 104 poised for coupling to the busbar connector 102 and the busbar 106. FIG. 18 is a side view of the power connector system 100 in accordance with an exemplary embodiment showing the electrical component 104 coupled to the busbar connector 102 and the busbar 106. FIGS. 17 and 18 illustrate the electrical component 104 including a circuit board 300 (as opposed to the box terminal 110 shown in FIGS. 2 and 3 or the pin terminal 116 shown in FIGS. 11 and 12). The circuit board 300 has a card edge 302 at an end of the circuit board 300. The card edge 302 is configured to be mated with the busbar connector 102. The circuit board 300 includes power contacts 304 along a first surface 306 and/or a second surface 308 of the circuit board 300. The power contacts 304 may be provided at or near the card edge 302. Alternatively, the power contacts 304 may be provided remote from the card edge 302. The power contacts 304 are configured to be mated with the busbar connector 102. Optionally, the circuit board 300 may be plugged into the busbar connector 102 such that the card edge 302 passes entirely through the busbar connector 102 and extends from the opposite side of the busbar 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector system comprising:
a busbar having a conductive plate, the conductive plate having first side and a second side, the conductive plate having a thickness profile between the first side and the second side, the conductive plate having a busbar opening therethrough between the first side and the second side; and
a busbar connector received in the busbar opening of the conductive plate, the busbar connector including a busbar housing and a busbar contact received in a socket of the busbar housing, the busbar housing being electrically conductive and electrically connected to the conductive plate in the busbar opening, the busbar contact being electrically conductive and electrically connected to the busbar housing in the socket, the busbar contact having a mating interface configured to mechanically and electrically connect to an electrical component plugged into the socket, wherein the busbar housing and the busbar contact are both contained within the thickness profile of the conductive plate;
wherein no portion of the busbar connector extends beyond the first side of the conductive plate and no portion of the busbar connector extends beyond the second side of the conductive plate.

2. The power connector system of claim 1, wherein the busbar connector has a thickness less than the thickness profile of the conductive plate.

3. The power connector system of claim 1, wherein the busbar housing includes a first side and a second side opposite the first side, the first side of the busbar housing being coplanar with or recessed interior of the first side of the conductive plate, the second side of the busbar housing being coplanar with or recessed interior of the second side of the conductive plate.

4. The power connector system of claim 1, wherein the busbar includes a flange extending into the busbar opening at the first side, the busbar housing being loaded into the busbar opening to engage the flange, the flange locating the busbar housing in the busbar opening.

5. The power connector system of claim 1, wherein the busbar housing is press-fit into the busbar opening.

6. The power connector system of claim 1, wherein the busbar housing includes knurled features at an exterior of the busbar housing, the knurled features engaging the conductive plate in the busbar opening to retain the busbar housing in the busbar opening.

7. The power connector system of claim 1, wherein the busbar contact includes a base and a plurality of contact fingers extending from the base, the base being mounted to the busbar housing, the contact fingers being independently movable relative to each other, the contact fingers each including a contact point defining the mating interface.

8. The power connector system of claim 1, wherein the busbar contact is elongated with the mating interface being planar.

9. The power connector system of claim 1, wherein the busbar contact includes a first contact member and a second contact member, the first contact member extending along a first side of the socket and the second contact member extending along a second side of the socket, the first contact member oriented parallel to the second contact member.

10. The power connector system of claim 1, wherein the busbar housing is ring shaped, the socket being circular.

11. The power connector system of claim 1, wherein the busbar housing is oval-shaped.

12. The power connector system of claim 1, wherein the socket is rectangular having a first side and a second side opposite to and parallel to the first side, the socket having a first end and a second end opposite to and parallel to the first end, the busbar contact extending along at least one of the first side and the second side.

13. A power connector system comprising:
a busbar having a conductive plate, the conductive plate having first side and a second side, the conductive plate having a thickness profile between the first side and the second side, the conductive plate having a busbar opening therethrough between the first side and the second side; and a busbar connector received in the busbar opening of the conductive plate, the busbar connector including a busbar housing and a busbar contact received in a socket of the busbar housing, the busbar housing being electrically conductive and electrically connected to the conductive plate in the busbar opening, the busbar contact being electrically conductive and electrically connected to the busbar housing in the socket, the busbar contact having a mating interface, wherein the busbar housing and the busbar contact are both contained within the thickness profile of the conductive plate, wherein no portion of the busbar connector extends beyond the first side of the conductive plate and no portion of the busbar connector extends beyond the second side of the conductive plate; and an electrical component plugged into the socket of the busbar contact to mechanically and electrically connect with the busbar contact, the electrical component extending from the busbar connector beyond at least one of the first side and the second side.

14. The power connector system of claim 13, wherein the electrical component includes a power terminal having a cylindrical pin being plugged into the socket to electrically connect to the busbar contact.

15. The power connector system of claim 13, wherein the electrical component includes a power terminal having a box terminal being plugged into the socket to electrically connect to the busbar contact, the box terminal having a first mating surface and a second mating surface parallel to the first mating surface, the busbar contact includes a first contact member and a second contact member, the first contact member extending along a first side of the socket and the second contact member extending along a second side of the socket, the first contact member oriented parallel to the second contact member, the first contact member being mated with the first mating surface, the second contact member being mated with the second mating surface.

16. The power connector system of claim 13, wherein the busbar housing includes a first side and a second side opposite the first side, the first side of the busbar housing being coplanar with or recessed interior of the first side of the conductive plate, the second side of the busbar housing being coplanar with or recessed interior of the second side of the conductive plate.

17. The power connector system of claim 13, wherein the busbar contact includes a base and a plurality of contact fingers extending from the base, the base being mounted to the busbar housing, the contact fingers being independently movable relative to each other, the contact fingers each including a contact point defining the mating interface.

18. The power connector system of claim 13, wherein the busbar includes a flange extending into the busbar opening at the first side, the busbar housing being loaded into the busbar opening to engage the flange, the flange locating the busbar housing in the busbar opening.

19. A power connector system comprising:

a busbar having a conductive plate, the conductive plate having first side and a second side, the conductive plate having a thickness profile between the first side and the second side, the conductive plate having a busbar opening therethrough between the first side and the second side; and a busbar connector received in the busbar opening of the conductive plate, the busbar connector including a busbar housing and a busbar contact received in a socket of the busbar housing, the socket being elongated in a longitudinal direction, the socket having a first edge and a second edge on opposite sides of the socket, the first and second edges extending longitudinally, the busbar housing being electrically conductive and electrically connected to the conductive plate in the busbar opening, the busbar contact being electrically conductive and electrically connected to the busbar housing in the socket, the busbar contact having a first mating interface along the first edge and a second mating interface along the second edge, wherein the busbar housing and the busbar contact are both contained within the thickness profile of the conductive plate; and an electrical component plugged into the socket of the busbar contact to mechanically and electrically connect with the busbar contact, the electrical component including a circuit card having a card edge between a first surface and a second surface of the circuit card, the circuit card including first card contacts at the first surface and second card contacts at the second surface, the circuit card being plugged into the socket of the busbar contact to interface the first card contacts with the first mating interface of the busbar contact and to interface the second card contacts with the second mating interface of the busbar contact, the circuit card extending from the busbar connector beyond at least one of the first side of the busbar and the second side of the busbar.

20. The power connector system of claim 19, wherein the busbar contact includes a first contact member and a second contact member, the first contact member extending along a first side of the socket and the second contact member extending along a second side of the socket, the first contact member oriented parallel to the second contact member.

\* \* \* \* \*